(12) United States Patent
Hirata

(10) Patent No.: US 10,780,878 B2
(45) Date of Patent: Sep. 22, 2020

(54) VEHICLE TURNING CONTROL DEVICE

(71) Applicant: NTN CORPORATION, Osaka (JP)

(72) Inventor: Junichi Hirata, Iwata (JP)

(73) Assignee: NTN CORPORATION, Osaka (JP)

( * ) Notice: Subject to any disclaimer, the term of this patent is extended or adjusted under 35 U.S.C. 154(b) by 137 days.

(21) Appl. No.: 16/302,890

(22) PCT Filed: May 17, 2017

(86) PCT No.: PCT/JP2017/018457
§ 371 (c)(1),
(2) Date: Nov. 19, 2018

(87) PCT Pub. No.: WO2017/204043
PCT Pub. Date: Nov. 30, 2017

(65) Prior Publication Data
US 2019/0176812 A1    Jun. 13, 2019

(30) Foreign Application Priority Data

May 23, 2016    (JP) .................................. 2016-102312

(51) Int. Cl.
*B60W 30/045*        (2012.01)
*B60W 40/068*        (2012.01)
(Continued)

(52) U.S. Cl.
CPC ........... *B60W 30/045* (2013.01); *B60T 8/172* (2013.01); *B60T 8/1755* (2013.01);
(Continued)

(58) Field of Classification Search
CPC ............. B60W 30/045; B60W 40/114; B60W 40/068; B60W 2552/40; B60W 2520/10;
(Continued)

(56) References Cited

U.S. PATENT DOCUMENTS 6,615,124 B1    9/2003 Adachi
6,708,088 B2    3/2004 Matsuno et al.
(Continued)

FOREIGN PATENT DOCUMENTS

DE    2011 077 153 A1    1/2012
EP      1 522 474 A2     4/2005
(Continued)

OTHER PUBLICATIONS

International Search Report dated Aug. 8, 2017 in corresponding International Application No. PCT/JP2017/018457.
(Continued)

*Primary Examiner* — Brian P Sweeney

(57) ABSTRACT

The vehicle turning control device for a vehicle includes a first road surface frictional coefficient calculator (22), a second road surface frictional coefficient calculator (25), a control gain calculator (23), a target yaw rate calculator (21), a target yaw rate corrector (27), a first braking/driving force calculator (24), and a second braking/driving force calculator (28). A second road surface frictional coefficient $\mu 2$ is obtained without braking/driving forces for respective wheels (2) being taken into consideration, and thus has a magnitude smaller than or equal to the magnitude of a first road surface frictional coefficient $\mu 1$. A braking/driving force command value calculator (29) calculates a braking/driving force command value from a braking/driving force (FA) and a braking/driving force (FB) which are respectively calculated with use of the first and second road surface frictional coefficients $\mu 1$ and $\mu 2$.

4 Claims, 5 Drawing Sheets

(51) Int. Cl.
  *B60W 40/114* (2012.01)
  *B60T 8/1755* (2006.01)
  *B60T 8/172* (2006.01)

(52) U.S. Cl.
  CPC ........ *B60W 40/068* (2013.01); *B60W 40/114* (2013.01); *B60W 2520/10* (2013.01); *B60W 2520/125* (2013.01); *B60W 2520/14* (2013.01); *B60W 2540/18* (2013.01); *B60W 2552/40* (2020.02)

(58) Field of Classification Search
  CPC ....... B60W 2520/125; B60W 2520/14; B60W 2540/18; B60W 2520/105; B60W 2720/14; B60W 2530/10; B60W 2710/083; B60W 2710/182; B60W 10/08; B60W 10/184; B60W 30/02; B60W 2050/0024; B60T 8/1755; B60T 8/172
  USPC .......................................................... 701/70
  See application file for complete search history.

(56) References Cited

U.S. PATENT DOCUMENTS

| | | |
|---|---|---|
| 7,657,357 B2 | 2/2010 | Matsuno |
| 9,487,232 B2 | 11/2016 | Ohmura et al. |
| 2002/0153770 A1 | 10/2002 | Matsuno et al. |
| 2005/0075771 A1 | 4/2005 | Matsuno |
| 2015/0175196 A1 | 6/2015 | Ohmura et al. |
| 2015/0239442 A1* | 8/2015 | Yamakado ........... B60W 40/114 701/70 |

FOREIGN PATENT DOCUMENTS

| | | |
|---|---|---|
| JP | 2000-28595 | 10/2000 |
| JP | 2000-289595 | 10/2000 |
| JP | 2002-316546 | 10/2002 |
| JP | 2006-82726 | 3/2006 |
| JP | 2009-278770 | 11/2009 |
| JP | 2010-188918 | 9/2010 |
| JP | 2015-120415 | 7/2015 |

OTHER PUBLICATIONS

International Preliminary Report on Patentability dated Dec. 6, 2018 in corresponding International Patent Application No. PCT/JP2017/018457.

Extended European Search Report dated Apr. 6, 2020 in European Patent Application No. 17802635.7.

* cited by examiner

VEHICLE TURNING CONTROL DEVICE

CROSS REFERENCE TO THE RELATED APPLICATION

This application is a National Phase application, under 35 U.S.C. § 371, of international application No. PCT/JP2017/018457, filed May 17, 2017, which claims Convention priority to Japanese patent application No. 2016-102312, filed May 23, 2016, the entire disclosures of which are herein incorporated by reference as a part of this application.

BACKGROUND OF THE INVENTION

Field of the Invention

The present invention relates to a turning control device for a vehicle with which the turning performance of a vehicle is improved and the orientation of the vehicle is kept stable in, for example, a place where the road surface frictional coefficient is low.

Description of Related Art

Conventionally, turning control devices for vehicles improve the turning performance of a vehicle by using a yaw moment generated owing to a difference in braking/driving force between left and right wheels. In this turning control, the orientation of the vehicle can be kept stable even when a tire slips in, for example, a place where the road surface frictional coefficient is low. For example, a control device has been proposed in which, while the turning performance is improved through yaw moment control that uses feedforward control and feedback control in combination, switching from the yaw moment control to vehicle-behavior-stabilizing control is performed as a turning degree approaches the limit (Patent Document 1).

RELATED DOCUMENT

Patent Document

[Patent Document 1] JP Laid-open Patent Publication No. 2015-120415

In the yaw moment control in Patent Document 1, the grip of a tire is not taken into consideration, and thus the following problems arise. For example, if the yaw moment control for improving the turning performance is performed in a case where the road surface frictional coefficient in a place where the vehicle is traveling is low, the grip of the tire exceeds the limit, and the vehicle behavior becomes unstable. In addition, even if switching is performed from the yaw moment control for improving the turning performance to the vehicle-behavior-stabilizing control when the turning degree approaches the limit, characteristics regarding turning, which is performed by the vehicle upon steering, vary between before and after the switching, and thus the driver may feel uncomfortable.

As technologies for solving such problems, the following proposal has been made. For example, there has been a technology of estimating a road surface frictional coefficient from the magnitude of an actual lateral acceleration detected by a lateral acceleration detector provided in a vehicle. A control gain is reduced in accordance with the magnitude of the estimated road surface frictional coefficient, and a yaw response characteristic, used for calculating a target yaw rate for yaw moment control, is returned from a yaw response characteristic higher than the original characteristic of the vehicle to that of the original turning performance of the vehicle, whereby the orientation of the vehicle is stabilized. In addition, a vehicle-orientation stabilization control device is provided, and the target yaw rate calculated by a target yaw rate calculator for use in the yaw moment control is used in also the vehicle-orientation stabilization control device, whereby the orientation of the vehicle is further stabilized.

In the proposed example described above, the road surface frictional coefficient is estimated from the magnitude of the actual lateral acceleration detected by the lateral acceleration detector provided in the vehicle, the control gain is reduced in accordance with the magnitude of the estimated road surface frictional coefficient, and the yaw response characteristic used for calculating the target yaw rate for the yaw moment control is returned from the yaw response characteristic higher than the original characteristic of the vehicle to that of the original turning performance of the vehicle, whereby the orientation of the vehicle is stabilized. However, a tire has a characteristic that lateral force capable of being generated is reduced when braking/driving force is applied. Thus, the lateral force of the tire is reduced when the braking/driving force is applied to the tire of a vehicle being turned, and the lateral acceleration of the vehicle may be reduced. Therefore, if the road surface frictional coefficient is estimated from only the magnitude of the actual lateral acceleration of the vehicle, an excessively small yaw moment is estimated. As a result, there arises a possibility that the turning performance is not sufficiently improved through the yaw moment control as a result of reduction in the control gain. On the other hand, in a situation where a tire is performing a sideslip while the vehicle is being turned on, for example, a road surface where the road surface frictional coefficient is low, the tire cannot generate any lateral force that exceeds the actual lateral acceleration of the vehicle. Thus, when an estimated value of the road surface frictional coefficient is excessively larger than the magnitude of the actual lateral acceleration of the vehicle, there is a possibility that the orientation of the vehicle is not stabilized.

SUMMARY OF THE INVENTION

An object of the present invention is to provide a vehicle turning control device with which, in a vehicle including braking/driving sources capable of independently controlling braking/driving forces that are braking forces or driving forces for respective wheels, yaw moment control for improving the turning performance can function, and the orientation of the vehicle can be kept stable even in, for example, a place where the road surface frictional coefficient is low.

Hereinafter, the present invention will be described with reference to reference numerals in embodiments, for convenience of easy understanding.

A turning control device for a vehicle according to the present invention is a turning control device for a vehicle including braking/driving sources 4, 8, 33 capable of independently controlling braking/driving forces that are braking forces or driving forces for respective wheels 2, a higher-order controller 10 configured to output a braking/driving command in response to a command from a manipulator, and a lower-order controller 11 configured to control the braking/driving sources 4, 8, 33 in response to the braking/driving command outputted by the higher-order controller 10, the turning control device for the vehicle including: a turning controller 13 provided between the higher-order controller 10 and the lower-order controller 11; a vehicle speed detector 16 configured to detect a vehicle speed; a steering angle detector 17 configured to detect a steering angle; and a yaw rate detector 18 configured to detect an actual yaw rate of the vehicle.

The turning controller 13 includes a first road surface frictional coefficient calculator 22 configured to estimate a first road surface frictional coefficient $\mu1$, a control gain calculator 23 configured to calculate a control gain such that a predetermined yaw response characteristic approaches a response characteristic inherent in the vehicle as the first road surface frictional coefficient $\mu1$ reduces, a target yaw rate calculator 21 configured to calculate a target yaw rate for the vehicle on the basis of the vehicle speed detected by the vehicle speed detector 16, the steering angle detected by the steering angle detector 17, and the predetermined yaw response characteristic, a first braking/driving force calculator 24 configured to calculate a first braking/driving force FA for each wheel 2 on the basis of a yaw moment to be generated to obtain the target yaw rate, a second road surface frictional coefficient calculator 25 configured to estimate a second road surface frictional coefficient $\mu2$ equal to or lower than the first road surface frictional coefficient $\mu1$, an upper limit yaw rate calculator 26 configured to calculate, on the basis of the second road surface frictional coefficient $\mu2$, an upper limit yaw rate capable of being obtained by the vehicle, a target yaw rate corrector 27 configured to correct the target yaw rate so as to be equal to or lower than the upper limit yaw rate, thereby obtaining a corrected target yaw rate, a second braking/driving force calculator 28 configured to calculate a second braking/driving force FB for each wheel on the basis of a yaw moment to be generated to reduce a deviation between the actual yaw rate and the corrected target yaw rate, and a braking/driving force command value calculator 29 configured to calculate a braking/driving force command value from the first braking/driving force FA and the second braking/driving force FB.

In the above-described configuration, the target yaw rate calculator 21 calculates the target yaw rate from the detected vehicle speed and steering angle, and the predetermined yaw response characteristic. As the yaw response characteristic, a yaw response characteristic different from the yaw response characteristic inherent in a vehicle 1 is preset, but is caused to approach the yaw response characteristic inherent in the vehicle 1 by reducing the control gain as the magnitude of the estimated road surface frictional coefficient $\mu1$ reduces. The control gain calculator 23 calculates the control gain from the road surface frictional coefficient $\mu1$, and the first braking/driving force calculator 24 calculates the first braking/driving force FA for each wheel 2 from a yaw moment to be generated to obtain the target yaw rate calculated with use of the control gain. The upper limit yaw rate calculator 26 calculates, from the second road surface frictional coefficient $\mu2$ different from the road surface frictional coefficient $\mu1$, the upper limit yaw rate capable of being obtained by the vehicle, and the target yaw rate corrector 27 corrects the target yaw rate to be equal to or lower than the upper limit yaw rate.

The second road surface frictional coefficient $\mu2$ has been obtained without the braking/driving force for each wheel 2 being taken into consideration, and thus has a magnitude smaller than or equal to the magnitude of the road surface frictional coefficient $\mu1$. By estimating the road surface frictional coefficient $\mu2$ from the actual lateral acceleration of the vehicle 1, a lateral force capable of being generated by each tire can be accurately estimated. The second braking/driving force calculator 28 calculates the second braking/driving force FB for each wheel 2 from a yaw moment to be generated by the vehicle 1 such that the deviation between the corrected target yaw rate and the detected actual yaw rate of the vehicle 1 reduces. The braking/driving force command value calculator 29 causes application, to each wheel 2, of the braking/driving force calculated (e.g., through composition or addition) from the braking/driving force FA and the braking/driving force FB, whereby the turning performance is improved and the orientation of the vehicle 1 is kept stable. As described above, by using a road surface frictional coefficient ($\mu2 \leq \mu1$) suitable for the characteristic of the control, an optimum control effect is obtained in various control.

By performing the above-described control, the road surface frictional coefficient is estimated in consideration of the braking/driving force for each tire, and thus the result of estimation of the road surface frictional coefficient is prevented from being excessively small, and the yaw moment control can be performed with an appropriate control gain. Thus, the turning performance is effectively improved through the yaw moment control. In addition, also in a situation where a tire is performing a sideslip while the vehicle is being turned on, for example, a road surface where the road surface frictional coefficient is low, the road surface frictional coefficient is estimated in consideration of a lateral force capable of being generated by the tire, and the braking/driving force for each wheel 2 is controlled with a yaw rate based on the road surface frictional coefficient being used as an upper limit value, whereby the orientation of the vehicle can be kept stable. In this manner, in the vehicle 1 including the braking/driving sources capable of independently controlling the braking/driving forces that are braking forces or driving forces for the respective wheels 2, the yaw moment control for improving the turning performance can function, and the orientation of the vehicle can be kept stable even in, for example, a place where the road surface frictional coefficient is low.

The present invention may further include a lateral acceleration detector 19 configured to detect a lateral acceleration of the vehicle, wherein the first road surface frictional coefficient calculator 22 may calculate the first road surface frictional coefficient $\mu1$ from at least the braking/driving forces for the respective wheels 2 and the lateral acceleration, and the second road surface frictional coefficient calculator 25 may calculate the road surface frictional coefficient $\mu2$ from at least the lateral acceleration. In this manner, the road surface frictional coefficient $\mu1$ is estimated, in consideration of the braking/driving forces, from the detected actual lateral acceleration of the vehicle 1 and the braking/driving forces being applied on the respective wheels 2, whereby the road surface frictional coefficient $\mu1$ can be accurately estimated as the maximal frictional force capable of being generated by the tire. In addition, in this configuration, a road surface frictional coefficient suitable for the control method can be easily estimated by an inexpensive detector without using any dedicated detector.

In the configuration where the lateral acceleration detector 19 is provided as described above and the road surface frictional coefficients $\mu1$ and $\mu2$ are calculated as described above, in the turning controller 13, the first road surface frictional coefficient calculator 22 may set an imaginary front-rear acceleration of the vehicle 1 to a value obtained by dividing a sum of magnitudes of the braking/driving forces for the respective wheels 2 by a vehicle weight of the vehicle 1, may calculate an imaginary acceleration of the vehicle from the imaginary front-rear acceleration and the lateral acceleration, and may set the road surface frictional coefficient μ1 to a value obtained by dividing the imaginary acceleration by a gravitational acceleration. In this configuration, the road surface frictional coefficient can be easily estimated in the vehicle 1 in which braking/driving forces are applied to four wheels.

In the configuration where the lateral acceleration detector 19 is provided as described above and the road surface frictional coefficients μ1 and μ2 are calculated as described above, in a case where the braking/driving forces are applied to either front wheels or rear wheels, the first road surface frictional coefficient calculator 22 may set an imaginary front-rear acceleration of the vehicle 1 to a value obtained by dividing a sum of magnitudes of the braking/driving forces for the respective wheels 2 by a vehicle weight applied on an axle to which the braking/driving forces are applied, may calculate an imaginary acceleration of the vehicle 1 from the imaginary front-rear acceleration and the lateral acceleration, and may set the road surface frictional coefficient μ1 to a value obtained by dividing the imaginary acceleration by a gravitational acceleration. In this configuration, the road surface frictional coefficient can be easily estimated even in a vehicle in which braking/driving forces are applied to two wheels.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
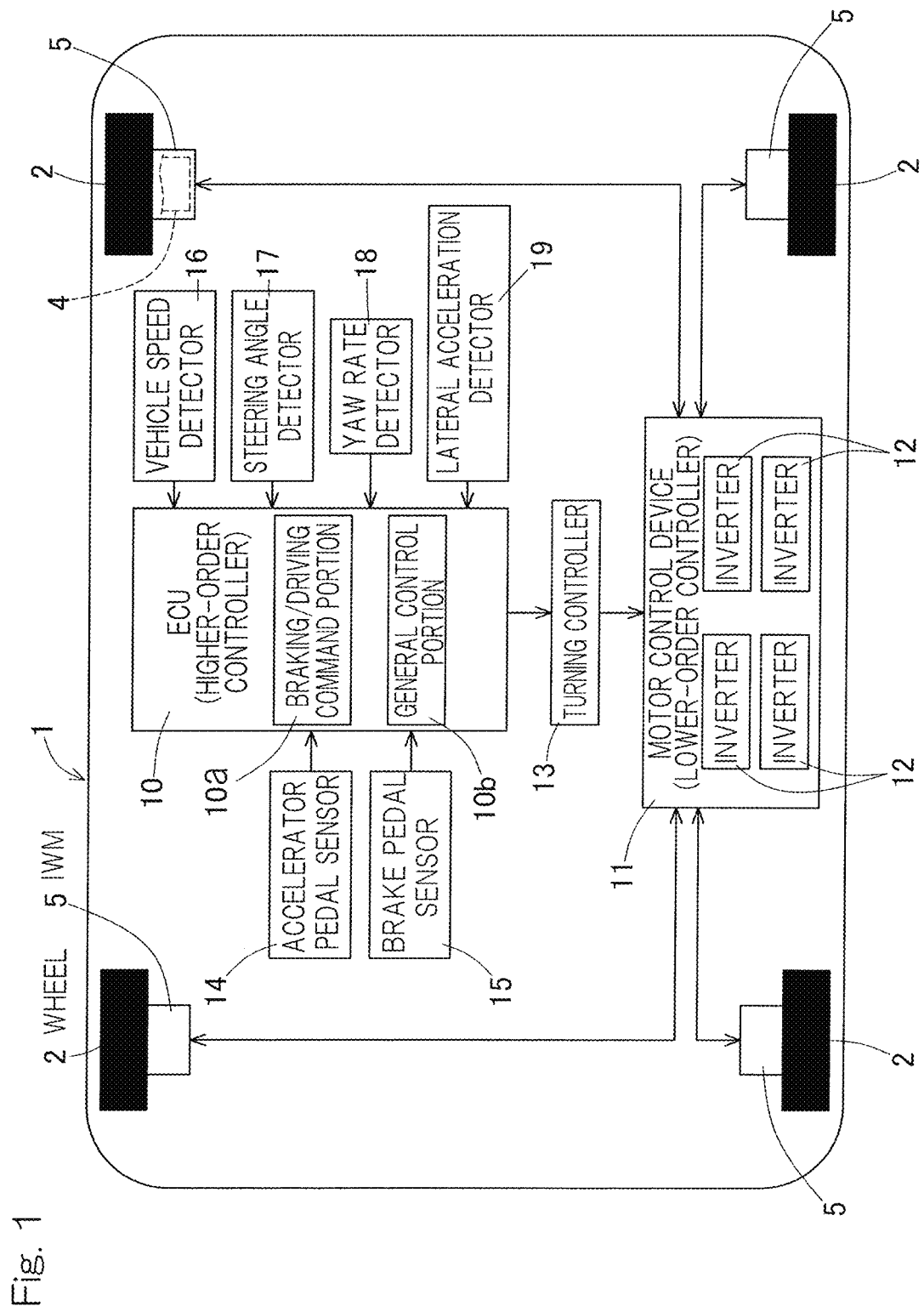
FIG. 1 is a system configuration diagram showing a schematic configuration of a turning control device for a vehicle according to a first embodiment of the present invention.

A turning control device for a vehicle according to a first embodiment of the present invention will be described with reference to FIG. 1 to FIG. 4. As shown in FIG. 1, as an example of a vehicle 1 mounted with the turning control device, a vehicle of a four-wheel independent driven type in which all of four wheels include in-wheel motor drive devices (hereinafter, also referred to simply as "IWMs") 5 serving as braking/driving sources capable of being separately controlled, will be described. In the vehicle 1, wheels 2 that are left and right rear wheels and wheels 2 that are left and right front wheels, are independently driven by electric motors 4.

Figure 2:
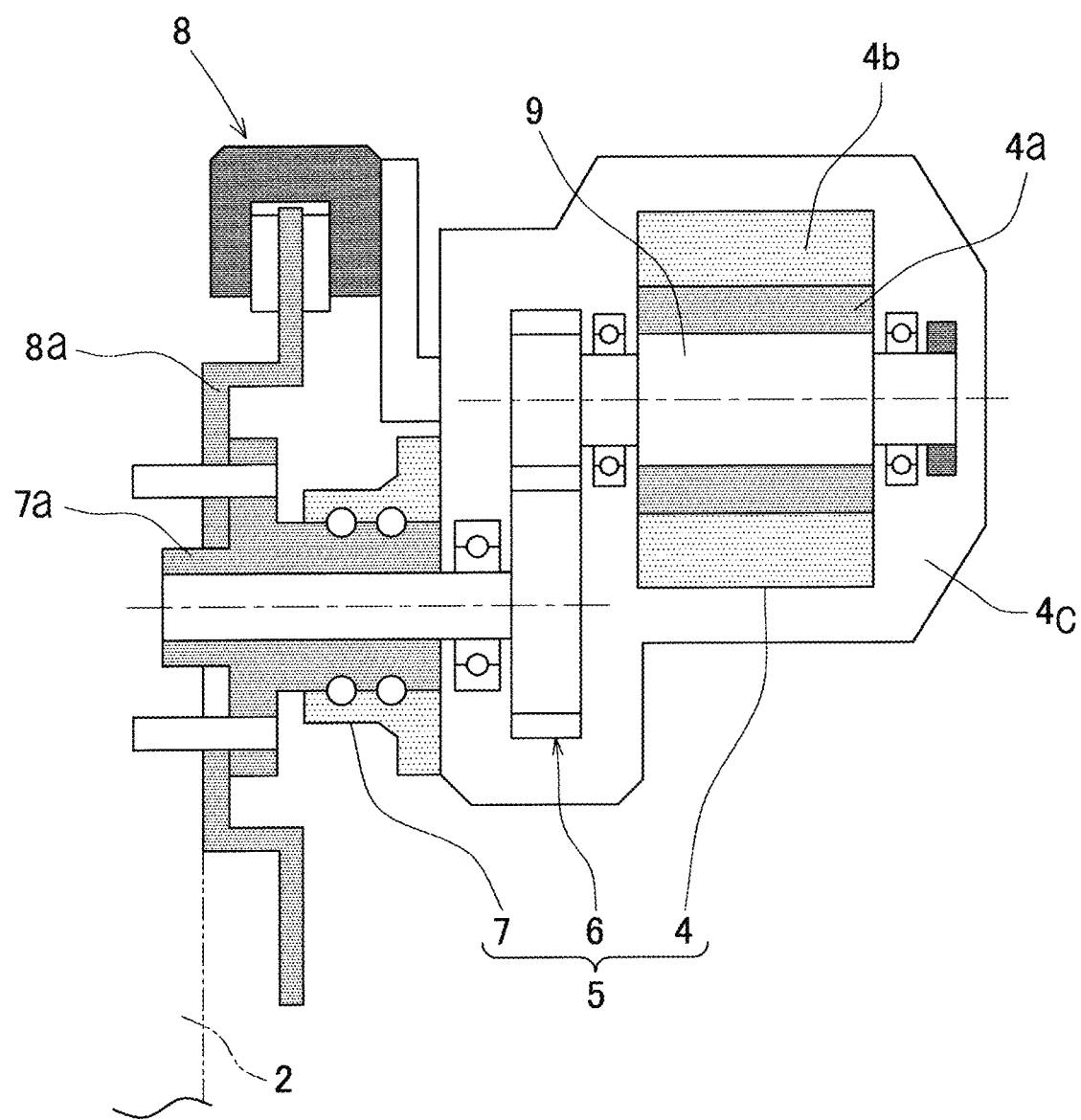
FIG. 2 is a cross-sectional view showing an example of an in-wheel motor drive device of the vehicle.

As shown in FIG. 2, each in-wheel motor drive device 5 includes the electric motor 4, a speed reducer or reduction gear 6, and a wheel bearing 7, and is partially or entirely disposed in the wheel 2. Rotation of the electric motor 4 is transmitted to the wheel 2 via the speed reducer 6 and the wheel bearing 7. The in-wheel motor drive device 5 generates driving torque or braking torque depending on the orientation of force generated in the electric motor 4 as a result of electrical conduction from a power supply or disconnection with the power supply. A brake rotor 8a composing a friction brake device which is a brake 8 is fixed to a flange portion of a hub ring 7a of the wheel bearing 7, and the brake rotor 8a is rotated integrally with the wheel 2. The electric motor 4 is, for example, an interior magnet synchronous motor in which a permanent magnet is included in a core portion of a rotor 4a. The electric motor 4 is a motor in which a radial gap is formed between a stator 4b fixed to a housing 4c and the rotor 4a mounted to a rotation output shaft 9.

In FIG. 1, a control system will be described. A control apparatus of the vehicle includes a main ECU (electrical control unit) 10 serving as a higher-order controller, and a motor controller 11 serving as a lower-order controller. A turning controller 13 is provided between the ECU 10 and the motor controller 11. The ECU 10, the turning controller 13, and the motor control device 11 (e.g., inverter devices 12) are connected to one another via an in-vehicle communication network such as a CAN (Control Area Network).

The ECU 10 is composed of a computer such as a microcomputer including a processor, a ROM (Read Only Memory) including a program to be executed by the computer, and various electronic circuits such as a RAM (Random Access Memory) and a co-processor, etc. The turning controller 13 may be provided as a part of the main ECU 10 or may be provided as a dedicated ECU. The motor control device 11 controls the electric motor 4 of the in-wheel motor drive device 5 serving as the braking/driving source, in response to a braking/driving command outputted from the ECU 10 via the turning controller 13. In the present embodiment, the motor control device 11 is composed of four inverter devices 12 which control the electric motors 4 of the respective wheels 2.

Each inverter device 12 converts DC power of a battery (not shown) into AC power for driving the electric motor 4, includes a control portion (not shown) for controlling the output thereof, and controls the corresponding electric motor 4 in accordance with a torque command value allocated to each wheel 2. Each inverter device 12 includes: a power circuitry (not shown) such as a bridge circuit composed of switching elements for performing conversion into AC power; and the above-described control portion (not shown) for controlling the power circuitry.

The outline of the turning controller 13 is as follows: the turning controller 13 corrects a command value of a braking/driving force for each wheel so as to perform turning assistance such as turning stabilization, with respect to the braking/driving command value outputted by the ECU 10, and outputs the resultant value to the motor control device 11.

The ECU 10 includes: a braking/driving command portion 10a which outputs braking/driving commands in response to command values that indicate manipulation amounts, which are obtained by an accelerator pedal sensor 14 and a brake pedal sensor 15 of an accelerator pedal and a brake pedal (neither of which are shown) serving as manipulator; and a general control portion 10b which performs cooperative control and integrated control of the entire vehicle. In a case where an automatic driving mechanism (not shown) is provided, the above-described manipulator may be the automatic driving mechanism.

When a driver manipulates the accelerator pedal so as to perform an instruction for drive, an accelerator command value is inputted from the accelerator pedal sensor 14 to the ECU 10. Similarly, when the driver manipulates the brake pedal so as to perform an instruction for braking, a brake command value is inputted from the brake pedal sensor 15 to the ECU 10. As command values of braking/driving forces, these command values are outputted from the braking/driving command portion 10a to the turning controller 13. Here, the command values of the braking/driving forces may be, for example, torque command values with signs (a positive sign indicates an accelerating command, and a negative sign indicates a decelerating command), but, in the present embodiment, the command values of the braking/driving forces include the accelerator command value and the brake command value. Besides the above, to the ECU 10, a vehicle speed is inputted from a vehicle speed detector 16, a steering angle is inputted from a steering angle detector 17, an actual yaw rate of the vehicle is inputted from a yaw rate detector 18, and an actual lateral acceleration of the vehicle is inputted from a lateral acceleration detector 19. These values are outputted from the ECU 10 to the turning controller 13.

The turning controller 13 corrects the command value of the braking/driving force for each wheel so as to perform turning assistance such as turning stabilization, with respect to the braking/driving command value outputted by the ECU 10, and outputs the resultant value to the motor controller 11.

Figure 3:
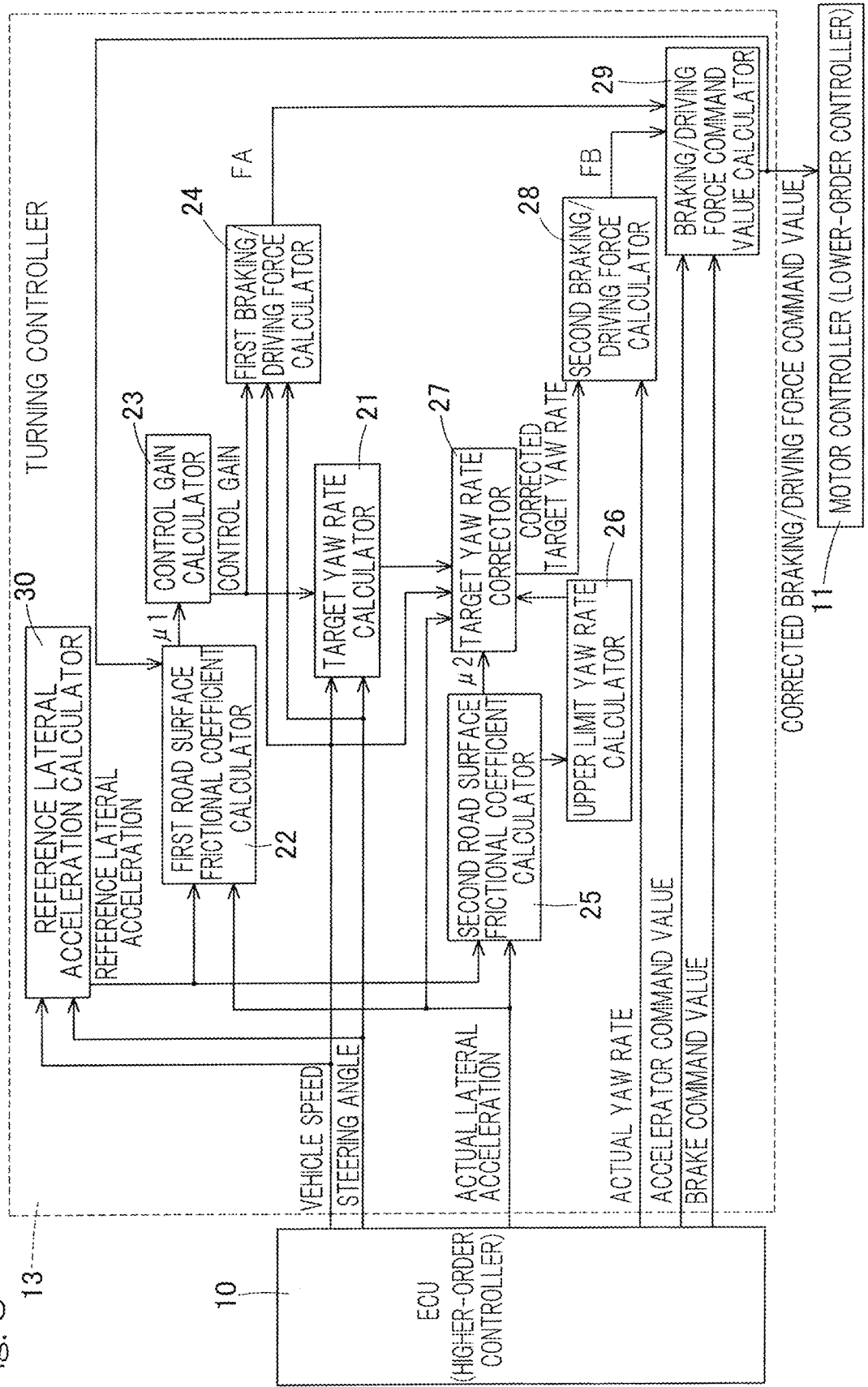
FIG. 3 is a block diagram showing a specific example of a part of the turning control device.

As shown in FIG. 3, the turning controller 13 includes a reference lateral acceleration calculator 30, a first road surface frictional coefficient calculator 22, a second road surface frictional coefficient calculator 25, a control gain calculator 23. The turning controller 13 further includes a target yaw rate calculator 21, an upper limit yaw rate calculator 26, a target yaw rate corrector 27, a first braking/driving force calculator 24, a second braking/driving force calculator 28, and a braking/driving force command value calculator 29.

To the turning controller 13, the vehicle speed, the steering angle, the actual lateral acceleration, the accelerator command value, and the brake command value are inputted from the ECU 10. The reference lateral acceleration calculator 30 calculates a reference lateral acceleration from the vehicle speed, the steering angle, and vehicle parameters such as a vehicle mass and a wheelbase.

In order to calculate a first road surface frictional coefficient µ1, the first road surface frictional coefficient calculator 22 calculates a lateral acceleration deviation on the basis of the difference between the reference lateral acceleration and the actual lateral acceleration. If the lateral acceleration deviation is equal to or lower than a threshold value $Gy_t$, the first road surface frictional coefficient µ1 is set to 1. If the lateral acceleration deviation exceeds the threshold value $Gy_t$, a value obtained by dividing, by a vehicle weight, the sum of the magnitudes of the braking/driving forces being applied on the respective wheels 2 is set as an imaginary front-rear acceleration of the vehicle, an imaginary acceleration of the vehicle is calculated from the imaginary front-rear acceleration and the lateral acceleration, and a value obtained by dividing the imaginary acceleration by a gravitational acceleration is set as the first road surface frictional coefficient µ1. That is, in a case where the reference lateral acceleration is represented by $Gy_{ref}$, the actual lateral acceleration is represented by $Gy_{act}$, the braking/driving forces for the respective wheels are represented by $F_i$ (i=1 to 4), the vehicle weight is represented by m, the imaginary front-rear acceleration is represented by Ax, the imaginary acceleration is represented by A, and the gravitational acceleration is represented by g, the road surface frictional coefficient µ1 is estimated as follows.

$$\text{If } Gy_{ref} - Gy_{act} \leq Gy_t \Rightarrow \mu 1 = 1 \tag{1}$$

$$\text{If } Gy_{ref} - Gy_{act} > Gy_t \Rightarrow \mu 1 = A/g \tag{2}$$

[Math. 1]

$$A = \sqrt{(Ax)^2 + Gy_{act}^2} \tag{3}$$

$$Ax = \frac{\sum_{i=1}^{4} |F_i|}{m} \tag{4}$$

The road surface frictional coefficient µ1 can be accurately estimated by being estimated from the braking/driving forces and the actual lateral acceleration. In a case where only the front wheels or the rear wheels are driven as driving wheels, only the braking/driving forces for the wheels to be driven are taken into consideration. For example, in a case where only the front wheels are braked/driven, and in a case where the braking/driving forces for the front wheels are represented by $Ff_i$ (i=1 or 2) and load on an axle of the front wheels is represented by mf, the imaginary front-rear acceleration Ax may be calculated as follows.

[Math. 2]

$$Ax = \frac{\sum_{i=1}^{2} |Ff_i|}{mf} \tag{5}$$

The same applies to a case where only the rear wheels are braked/driven. By calculating the imaginary front-rear acceleration as described above, the road surface frictional coefficient can be accurately estimated in the case where only the front wheels or the rear wheels are driven.

The target yaw rate calculator 21 calculates a target yaw rate r(s) relative to a steering angle δ(s), as expressed in a second-order lag system transfer function shown in formula (6), for example.

[Math. 3]

$$\frac{r(s)}{\delta(s)} = G_\delta^r(0) \frac{(\alpha \omega_n)^2 (1 + T_r s)}{(\alpha \omega_n)^2 + 2\left(\frac{\zeta}{\lambda}\right)(\alpha \omega_n)s + s^2} \tag{6}$$

Formula (6) includes elements calculated from the vehicle speed and vehicle parameters such as the vehicle mass and the wheelbase, i.e., $G_\delta^r(0)$ representing a yaw angular velocity gain constant, $\omega_n$ representing a natural frequency in the yaw direction, $\zeta$ representing an attenuation coefficient in the yaw direction, $T_r$ representing a yaw angular velocity time constant, and further, s representing a Laplace operator, $\alpha$ representing a control gain of the natural frequency $\omega_n$, and $\lambda$ representing a control gain of the attenuation coefficient $\zeta$. If the control gain is greater than 1, rising of the target yaw rate becomes fast. If the control gain is 1, the original yaw response characteristic of the vehicle is obtained.

Figure 4:
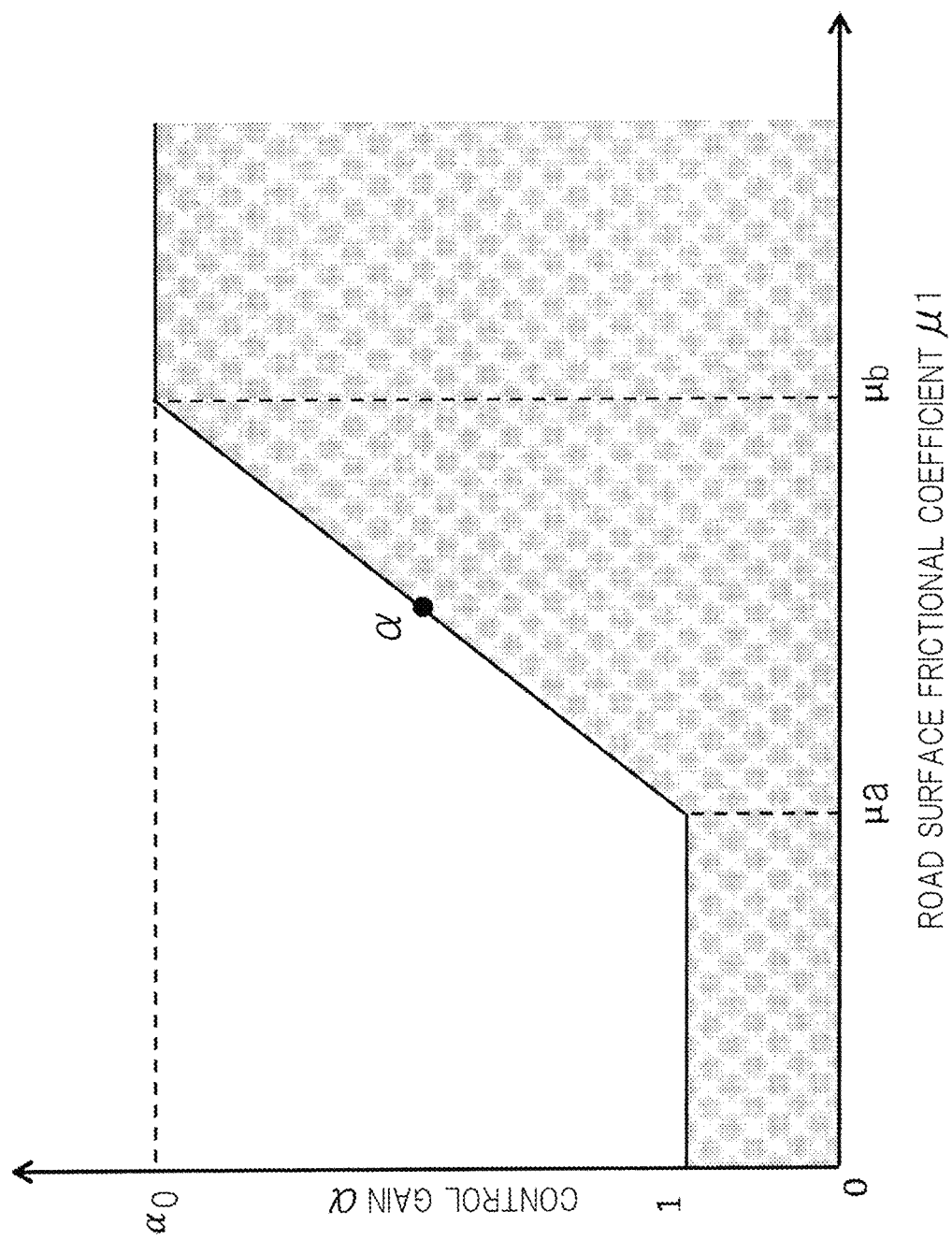
FIG. 4 is a graph showing the relationship among road surface frictional coefficient, threshold values thereof, and control gain, in the turning control device.

The control gain calculator 23 calculates the control gains in accordance with the magnitude of the road surface frictional coefficient μ1. As described above, of the control gains, the control gain of the natural frequency $\omega_n$ in the yaw direction is represented by $\alpha$ and the control gain of the attenuation coefficient $\zeta$ in the yaw direction is represented by $\lambda$. All of the following descriptions regarding the control gains will be made with a being used as an example. Two threshold values may be set for the first road surface frictional coefficient μ1, as shown in FIG. 4. If the road surface frictional coefficient is smaller than $\mu_b$, the control gain $\alpha$ is caused to approach from an initial value $\alpha_0$ to 1. If the road surface frictional coefficient is smaller than $\mu_a$, the control gain $\alpha$ is set to 1. In a place where the road surface frictional coefficient is low, the tire is likely to lose the grip force, and thus the control gain is reduced so that the braking/driving force to be generated through the yaw moment control is reduced. In a place where the road surface frictional coefficient is high, the grip force of the tire is restored, and thus the control gain is returned to the initial value thereof so that the braking/driving force to be generated through the yaw moment control is increased.

The first braking/driving force calculator 24 calculates a yaw moment $M_z(s)$ relative to the steering angle $\delta(s)$ with use of, for example, a third-order lag system transfer function shown in formula (7), and calculates, from the yaw moment $M_z(s)$, a braking/driving force FA to be applied on each wheel.

[Math. 4]

$$\frac{M_z(s)}{\delta(s)} = \frac{G_\delta^r(0)\frac{(\alpha\omega_n)^2(1+T_r s)}{(\alpha\omega_n)^2+2\left(\frac{\zeta}{\lambda}\right)(\alpha\omega_n)s+s^2} - G_\delta^r(0)\frac{\omega_n^2(1+T_r s)}{\omega_n^2+2\zeta\omega_n s+s^2}}{G_M^r(0)\frac{\omega_n^2(1+T_M s)}{\omega_n^2+2\zeta\omega_n s+s^2}} \quad (7)$$

As in formula (6), formula (7) includes elements calculated from the vehicle speed and vehicle parameters such as the vehicle mass and the wheelbase, i.e., $G_\delta^r(0)$ representing the yaw angular velocity gain constant, $\omega_n$ representing the natural frequency in the yaw direction, $\zeta$ representing the attenuation coefficient in the yaw direction, $T_r$ representing the yaw angular velocity time constant, $G_M^r(0)$ representing a yaw moment gain constant, $T_M$ representing a yaw moment time constant, and further, s representing the Laplace operator, $\alpha$ representing the control gain of the natural frequency $\omega_n$, and $\lambda$ representing the control gain of the attenuation coefficient $\zeta$. As shown in formula (7), if the control gains $\alpha$ and $\lambda$ are 1, the yaw moment $M_z(s)$ relative to the steering angle $\delta(s)$ becomes zero (the numerator becomes zero). By applying the braking/driving force FA based on $M_z(s)$ to each wheel, the actual yaw rate of the vehicle can be approximately equalized to the target yaw rate.

In order to calculate a second road surface frictional coefficient μ2, the second road surface frictional coefficient calculator 25 calculates a lateral acceleration deviation on the basis of the difference between the reference lateral acceleration and the actual lateral acceleration. If the lateral acceleration deviation is equal to or lower than the threshold value $Gy_t$, the road surface frictional coefficient μ2 is set to 1. If the lateral acceleration deviation exceeds the threshold value $Gy_t$, a value obtained by dividing the absolute value of the actual lateral acceleration by a gravitational acceleration is set as the road surface frictional coefficient μ2. That is, in a case where the reference lateral acceleration is represented by $Gy_{ref}$ and the actual lateral acceleration is represented by $Gy_{act}$, the road surface frictional coefficient μ2 is estimated as follows.

[Math. 5]

$$\text{If } Gy_{ref} - Gy_{act} \leqq Gy_t \Rightarrow \mu 2 = 1 \quad (8)$$

$$\text{If } Gy_{ref} - Gy_{act} > Gy_t \Rightarrow \mu 2 = \frac{|Gy_{act}|}{g} \quad (9)$$

The upper limit yaw rate calculator 26 calculates, from the second road surface frictional coefficient μ2, an upper limit yaw rate capable of being obtained by the vehicle.

The target yaw rate corrector 27 uses the upper limit yaw rate calculated from the road surface frictional coefficient μ2 and the vehicle speed by the upper limit yaw rate calculator 26, to output a corrected target yaw rate obtained by correction performed such that the magnitude of the target yaw rate becomes equal to or lower than the upper limit yaw rate. Here, in a case where the vehicle speed is represented by V and the upper limit yaw rate is represented by $r_u$, the upper limit yaw rate can be calculated as follows.

[Math. 6]

$$r_u = \frac{\mu 2 g}{V} \quad (10)$$

By setting the upper limit value of the target yaw rate with use of the road surface frictional coefficient estimated from the actual lateral acceleration, a yaw rate actually capable of being obtained can be used as the upper limit, whereby the orientation of the vehicle can be kept stable. The second road surface frictional coefficient μ2 has been obtained without taking the braking/driving force into consideration as described above, and thus has a magnitude smaller than or equal to that of the road surface frictional coefficient μ1.

The second braking/driving force calculator 28 calculates a yaw rate deviation on the basis of the difference between the actual yaw rate and the corrected target yaw rate, and calculates a braking/driving force FB for each wheel 2 so as to generate a yaw moment for reducing the yaw rate deviation. The magnitude of the yaw moment can be obtained by, for example, performing PID control.

The braking/driving force command value calculator 29 calculates (e.g., through addition or composition) a braking/driving force command value to be sent to the motor controller 11, by use of: the braking/driving force FA for each wheel 2 calculated by the first braking/driving force calculator 24; the braking/driving force FB for each wheel 2 calculated by the second braking/driving force calculator 28; the accelerator command value; and the brake command value. That is, the braking/driving force command value calculator 29 outputs a corrected braking/driving force command value for each wheel obtained by the above-described calculation. The corrected braking/driving force command value, and the pre-correction braking/driving force command value inputted to the braking/driving force command value calculator 29, may be identical to each other or different from each other in terms of data format or the like. The motor controller 11 drives the electric motor 4 of the in-wheel motor drive device 5, by controlling current such that the braking/driving force for each wheel 2 becomes or corresponds to the braking/driving force command value.

The braking/driving command portion 10a, the general control portion 10b, and sections in the turning controller 13 such as the target yaw rate calculator 21 are, specifically, configured with a hardware circuit or a software mathematical function on a processor (not shown) that enables calculation and output of a result thereof, with use of an LUT (Look Up Table) implemented by software or hardware, or a prescribed transform function contained in a library of software, or hardware equivalent thereto, etc., or, as necessary, a comparison function or a four arithmetic operation function in the library, or hardware equivalent thereto, etc.

Operations and effects of the above-described embodiment will be described. The target yaw rate calculator 21 calculates the target yaw rate from the detected vehicle speed and steering angle, and the predetermined yaw response characteristic. As the yaw response characteristic, a yaw response characteristic different from the yaw response characteristic inherent in the vehicle is preset, but is caused to approach the yaw response characteristic inherent in the vehicle by reducing the control gain as the magnitude of the estimated first road surface frictional coefficient $\mu 1$ reduces. The first road surface frictional coefficient calculator 22 estimates the first road surface frictional coefficient $\mu 1$ from the detected actual lateral acceleration of the vehicle and the braking/driving force being applied on each wheel 2. If the braking/driving force is taken into consideration, the first road surface frictional coefficient $\mu 1$ can be accurately estimated as a maximal frictional force capable of being generated by the tire of the wheel 2.

The control gain calculator 23 calculates the control gain from the first road surface frictional coefficient $\mu 1$. The first braking/driving force calculator 24 calculates the braking/driving force FA for each wheel 2 from a yaw moment to be generated to obtain the target yaw rate calculated with use of the control gain, from the vehicle speed and the steering angle.

The second road surface frictional coefficient calculator 25 estimates, from the actual lateral acceleration of the vehicle, the second road surface frictional coefficient $\mu 2$ different from the above-described first road surface frictional coefficient $\mu 1$. The road surface frictional coefficient $\mu 2$ has been obtained without the braking/driving force for each wheel 2 being taken into consideration, and thus has a magnitude smaller than or equal to the magnitude of the road surface frictional coefficient $\mu 1$. The upper limit yaw rate calculator 26 calculates, from the second road surface frictional coefficient $\mu 2$, the upper limit yaw rate capable of being obtained by the vehicle 1, and the target yaw rate corrector 27 corrects the target yaw rate to be equal to or lower than the upper limit yaw rate. By estimating the second road surface frictional coefficient $\mu 2$ from the actual lateral acceleration of the vehicle, a lateral force capable of being generated by the tire can be accurately estimated.

The second braking/driving force calculator 28 calculates the second braking/driving force FB for each wheel 2 from a yaw moment to be generated in the vehicle such that the deviation between the corrected target yaw rate and the detected actual yaw rate of the vehicle 1 is reduced. By applying, to each wheel 2, a braking/driving force obtained by composition of the first braking/driving force FA and the second braking/driving force FB, the turning performance is improved and the orientation of the vehicle is kept stable.

By performing the above-described control as in the present embodiment, the road surface frictional coefficient is estimated in consideration of the braking/driving force for each tire, and thus the result of estimation of the road surface frictional coefficient is prevented from being excessively small, and the yaw moment control can be performed with an appropriate control gain. Thus, the turning performance is effectively improved through the yaw moment control. In addition, also in a situation where a tire is performing a sideslip while the vehicle is being turned on, for example, a road surface where the road surface frictional coefficient is low, the road surface frictional coefficient is estimated in consideration of a lateral force capable of being generated by a tire, and the braking/driving force for each wheel is controlled with a yaw rate based on the road surface frictional coefficient being used as an upper limit value, whereby the orientation of the vehicle can be kept stable. In this manner, in the vehicle 1 including the braking/driving sources capable of independently controlling the braking/driving forces that are braking forces or driving forces for the respective wheels 2, the yaw moment control for improving the turning performance can function, and the orientation of the vehicle can be kept stable even in, for example, a place where the road surface frictional coefficient is low.

Figure 5:
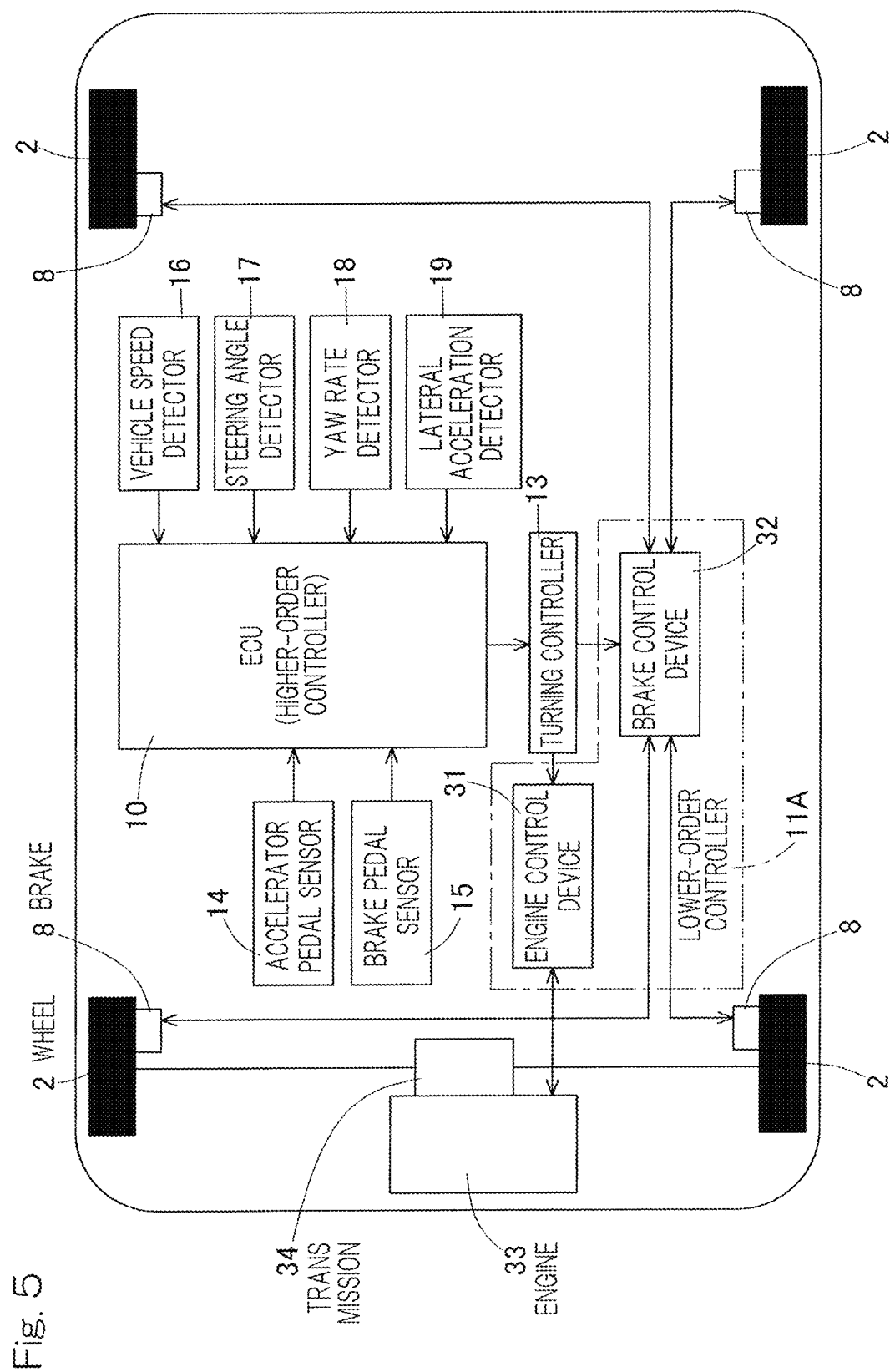
FIG. 5 is a system configuration diagram showing a schematic configuration of a turning control device for a vehicle according to another embodiment of the present invention.

In the above-described embodiment, the vehicle of a four-wheel independent driven type including the in-wheel motor drive devices 5 has been described. However, the present invention can be applied to also a vehicle of a two-front-wheel independent driven type and a vehicle of a two-rear-wheel independent driven type, and can be applied to also a vehicle as shown in FIG. 5 in which the driving force of one engine 33 is transmitted to the left and right wheels 2 (the front wheels or the rear wheels) through a transmission 34 and in which the brake 8 such as a friction brake is provided to each of the front, rear, left, and right wheels 2. In this case, a lower-order controller 11A is composed of an engine control device 31 for controlling the engine 33, and a brake control device 32 for controlling the brake 8 of each wheel, and the engine control device 31 and the brake control device 32 perform control operations in accordance with the braking/driving forces outputted by the turning controller 13, whereby, as in the above-described embodiment, the yaw moment control for improving the turning performance can function, and the orientation of the vehicle can be kept stable even in, for example, a place where the road surface frictional coefficient is low.

Although the present invention has been fully described in connection with the preferred embodiments thereof with reference to the accompanying drawings, numerous additions, changes, or deletions can be made without departing from the gist of the present invention. Therefore, such additions, changes, and deletions are also construed as included within the scope of the present invention.

REFERENCE NUMERALS 1 vehicle
2 wheel
4 electric motor
5 in-wheel motor drive device (braking/driving source)
8 brake (braking/driving source)
10 ECU (higher-order controller)
11 motor controller (lower-order controller)
11A lower-order controller
13 turning controller
14 accelerator pedal sensor
15 brake pedal sensor
21 target yaw rate calculator
22 first road surface frictional coefficient calculator
23 control gain calculator
24 first braking/driving force calculator
25 second road surface frictional coefficient calculator
26 upper limit yaw rate calculator
27 target yaw rate corrector
28 second braking/driving force calculator
29 braking/driving force command value calculator
30 reference lateral acceleration calculator
33 engine (braking/driving source)

What is claimed is:

1. A turning control device for a vehicle including braking/driving sources capable of independently controlling braking/driving forces that are braking forces or driving forces for respective wheels, a higher-order controller configured to output a braking/driving command in response to a command from a manipulator, and a lower-order controller configured to control the braking/driving sources in response to the braking/driving command outputted by the higher-order controller,
the turning control device for the vehicle comprising:
a turning controller provided between the higher-order controller and the lower-order controller;
a vehicle speed detector configured to detect a vehicle speed;
a steering angle detector configured to detect a steering angle; and
a yaw rate detector configured to detect an actual yaw rate of the vehicle, wherein
the turning controller includes
a first road surface frictional coefficient calculator configured to estimate a first road surface frictional coefficient $\mu 1$,
a control gain calculator configured to calculate a control gain such that a predetermined yaw response characteristic approaches a response characteristic inherent in the vehicle as the first road surface frictional coefficient $\mu 1$ reduces,
a target yaw rate calculator configured to calculate a target yaw rate for the vehicle on the basis of the vehicle speed detected by the vehicle speed detector, the steering angle detected by the steering angle detector, and the predetermined yaw response characteristic,
a first braking/driving force calculator configured to calculate a first braking/driving force FA for each wheel on the basis of a yaw moment to be generated to obtain the target yaw rate,
a second road surface frictional coefficient calculator configured to estimate a second road surface frictional coefficient $\mu 2$ equal to or lower than the first road surface frictional coefficient $\mu 1$,
an upper limit yaw rate calculator configured to calculate, on the basis of the second road surface frictional coefficient $\mu 2$, an upper limit yaw rate capable of being obtained by the vehicle,
a target yaw rate corrector configured to correct the target yaw rate so as to be equal to or lower than the upper limit yaw rate, thereby obtaining a corrected target yaw rate,
a second braking/driving force calculator configured to calculate a second braking/driving force FB for each wheel on the basis of a yaw moment to be generated to reduce a deviation between the actual yaw rate and the corrected target yaw rate, and
a braking/driving force command value calculator configured to calculate a braking/driving force command value from the first braking/driving force FA and the second braking/driving force FB.

2. The turning control device for the vehicle as claimed in claim 1, further comprising
a lateral acceleration detector configured to detect a lateral acceleration of the vehicle, wherein
the first road surface frictional coefficient calculator calculates the first road surface frictional coefficient $\mu 1$ from at least the braking/driving forces for the respective wheels and the lateral acceleration, and
the second road surface frictional coefficient calculator calculates the road surface frictional coefficient $\mu 2$ from at least the lateral acceleration.

3. The turning control device for the vehicle as claimed in claim 2, wherein
the first road surface frictional coefficient calculator
sets an imaginary front-rear acceleration of the vehicle to a value obtained by dividing a sum of magnitudes of the braking/driving forces for the respective wheels by a vehicle weight,
calculates an imaginary acceleration of the vehicle from the imaginary front-rear acceleration and the lateral acceleration, and
sets the road surface frictional coefficient $\mu 1$ to a value obtained by dividing the imaginary acceleration by a gravitational acceleration.

4. The turning control device for the vehicle as claimed in claim 2, wherein
in a case where the braking/driving forces are applied to either front wheels or rear wheels,
the first road surface frictional coefficient calculator
sets an imaginary front-rear acceleration of the vehicle to a value obtained by dividing a sum of magnitudes of the braking/driving forces for the respective wheels by a vehicle weight applied on an axle to which the braking/driving forces are applied,
calculates an imaginary acceleration of the vehicle from the imaginary front-rear acceleration and the lateral acceleration, and
sets the road surface frictional coefficient $\mu 1$ to a value obtained by dividing the imaginary acceleration by a gravitational acceleration.

* * * * *

UNITED STATES PATENT AND TRADEMARK OFFICE
CERTIFICATE OF CORRECTION

PATENT NO. : 10,780,878 B2  
APPLICATION NO. : 16/302890  
DATED : September 22, 2020  
INVENTOR(S) : Junichi Hirata Page 1 of 1

It is certified that error appears in the above-identified patent and that said Letters Patent is hereby corrected as shown below:

On the Title Page

Item [56] (References Cited), Line 7 (approx.), Delete "2011 077 153 A1" and insert -- 10 2011 077 153 A1 --, therefor.

Signed and Sealed this  
Twenty-ninth Day of December, 2020

Andrei Iancu  
*Director of the United States Patent and Trademark Office*